United States Patent [19]

Leys et al.

[11] Patent Number: 5,376,705
[45] Date of Patent: Dec. 27, 1994

[54] ONE COAT PROTECTIVE SYSTEM FOR A SURFACE

[75] Inventors: Cassius W. Leys, Hartsdale; Edward Walsh, III, Valley Cottage, both of N.Y.

[73] Assignee: Transcontinental Marketing Group, Inc., Windham, N.Y.

[21] Appl. No.: 49,521

[22] Filed: Apr. 19, 1993

Related U.S. Application Data

[63] Continuation of Ser. No. 762,864, Sep. 18, 1991, abandoned.

[51] Int. Cl.5 .......................... C08K 3/20; C08L 63/02
[52] U.S. Cl. ................................ 523/417; 525/523; 525/524
[58] Field of Search ............... 523/415, 418, 463, 417; 525/523, 524

[56] References Cited

U.S. PATENT DOCUMENTS 4,716,056 12/1987 Fox et al. ..................... 427/407.1
4,826,894 5/1989 Markusch et al. .................. 523/415

OTHER PUBLICATIONS

Tess and Poehlein editors, Applied Polymer Science (1985) pp. 988, 989, and 992.

*Primary Examiner*—Melvyn I. Marquis
*Assistant Examiner*—D. Aylward
*Attorney, Agent, or Firm*—Ohlandt, Greeley & Ruggiero

[57] ABSTRACT

There is provided a one coat system. The system, among other benefits, encapsulates lead paint, encapsulates and covers existing graffiti, prevents the leaching out of the harmful lead paint salts and graffiti from the encapsulated areas, and prevents the penetration into a substrate of future graffiti. The system includes a film forming mixture and a curing and activator mixture. The film forming mixture has a water based epoxy group of components, a water based polyurethane solution, a solvent based polyurethane group of components, and an oil based additive. The curing mixture has a water based epoxy group of components and oil ester based, iso-cyanate free, catalyst-curing agents. The film forming mixture is between about 93 and about 105 parts by volume of the system. The curing and activator mixture is between about 76 and about 83 parts of the system.

27 Claims, No Drawings

ONE COAT PROTECTIVE SYSTEM FOR A SURFACE

This is a continuation of application Ser. No. 07/762,864, filed Sep. 18, 1991, now abandoned

BACKGROUND OF THE INVENTION

The present invention relates to a one coat protective system to be applied to a surface. More particularly, it relates to a multiple component, two part mixture that forms a system that provides a one coat, protective film coat on a surface. The system's film coat treats, protects and encapsulates substantive substrates or surfaces that include, for example, masonary, such as cement, cement blocks, concrete, aggregates, brick, mortar and the like, plaster, plaster board and other wall covering compositions, wood, metal and aluminum. These surfaces can be either painted or unpainted.

This present invention possesses certain properties not generally available in water based coatings, and a variety of environmental properties not possible with solvent based coatings. These properties are due to the combination in the present system of, heretofore uncombinable, water based epoxy, water based polyurethane, solvent based polyurethane and oil based additives.

The properties of the film coat of the present system include unique elastomeric film characteristics that render the film flexible enough to compensate for expansion and contraction, as well as minor flexing of the surface without cracking or splitting of the system's film coat. Also, the system provides the surface with improved adhesion to any clean surface, a waterproof coat, and an ability to be repeatedly cleaned with commercially available household cleaners or soap and water. In addition, the system provides the surface with a protective coat that permits repeated cleaning of subsequently applied graffiti using a particular cleaning composition, without altering the surface or causing damage to any area in close proximity to the surface.

In particular, the system provides an elastomeric protective film coat with extraordinary adhesive and micro non-porous waterproof and penetration resistant properties that permits the coat to encapsulate lead paint, graffiti and certain other contaminants (i.e. toxic paint, salt and the like). The encapsulation prevents leaching or bleed-thru of the contaminant through the film coat. The coat also prevents permanent adhesion to, and or staining of, the protective coat by future graffiti or other surface vandalism and defacing contaminants. It is anticipated that the system's protective film coat will also encapsulate asbestos.

It has been found that the coat withstands multiple cleanings of subsequently applied graffiti with one or more non-abrasive, non-caustic, non-acidic graffiti cleaners, such as the cleaner that is the subject of U.S. Pat. No. 5,024,780, which issued Jun. 18, 1991, to Cassius Leys, an inventor of the present invention, without any damage to the film coat or the underlying surface. It has also been found that the system's film coat protects the surface from the deleterious effects of acid rain, and the corrosion, pitting, degradation and decay that is caused by atmospheric conditions, chemical contaminants from air-pollution, spills, salt spray, mildew, fungus stains, water and sunlight. Further, the coat provides an anti-soiling, scuff and scratch resistant protective film coat that can be inexpensively and repeatedly cleaned with standard non-caustic, non-abrasive commercially available household cleaners of grease, oil, other hydro carbon contaminants, urine, mildews and general soiling contamination. The coat also provides a waterproof and hydrostatic water pressure resistant barrier for substrates, such as a cellars, tunnels, retainer and subterranean walls, where dampness, moisture or water seepage is a problem. Still further, the system's film coat provides a high degree of dielectric resistance for certain surfaces. Still even further, the protective coat, with the incorporation of certain special bittering/adversive agents, is virtually ingestion proof by humans, animals, certain insects, birds and most marine life.

All of the above is accomplished within a framework of an environmentally and worker safe, non-flammable, negligible volatile organic compounds (VOC) and non-hazardous film coating formulation and system.

1. Field of the Invention

The present invention is particularly useful as a graffiti deterrent protective coating and an anti-soiling protective coating because of its micro non-porosity and high penetration resistance to solvent paints. Specifically, the vast majority of graffiti is spray paint and color markers having pigments or dyes with fast drying solvents, and solvent or oil based paints, including enamels, epoxies, lacquers and urethanes. Since graffiti is generally applied by a variety of methods, but most frequently by spray cans and color markers, the only practical solution to prevent future graffiti is the use of a protective coat that can be easily, inexpensively, and repeatedly cleaned of graffiti.

The methods for removing graffiti from unprotected surfaces have, heretofore, been economically prohibitive and also environmentally hazardous. The physical methods have included scraping, sandblasting, hydro-sanding or hydro-blasting the surface that bears the graffiti. These methods have been found to etch and score, and, therefore, make the surface porous and rough. Accordingly, the surface is more susceptible to weathering, general deterioration and permanent staining. Further, sandblasting often emits potentially carcinogenic and silicous particles into the air.

Chemicals methods include the use of strong acids, caustic materials or VOC solvents to remove graffiti from both painted and unprotected surfaces. These methods are now being restricted as they pose environmentally hazardous and safety risks that have, theretofore, required extensive steps to: (1) protect the surrounding environment, (2) neutralize and remove the hazardous waste resulting from their use, and (3) protect the worker by using protective clothing and equipment. It has also been found that the repeated use of these chemicals damages most painted surfaces.

Generally, all of these methods require a subsequent recoating of the surface with a high VOC protective coat in order to protect the surface from further deterioration. Depending on the nature of the surface, these methods often have a potentially deleterious effect on any surface area in close proximity thereto. Also, the use of such methods have been proved to be extremely costly, particularly where the surface has had its porosity greatly increased.

Perhaps the most common method currently used to handle graffiti has been to repaint the surface. This approach is, perhaps, the least effective since it requires the use of a paint that is capable of covering the graffiti without bleeding through ("bleed-thru") the new paint.

This is usually not possible with most solvent reducable paints since the solvents dissolve the graffiti and bleed-thru the new paint, leaving shadows or stains embedded in the paint.

Most of the currently available anti-graffiti and anti-corrosion protective coating systems are solvent based and rely on high VOC components, such as urethanes, epoxies and acrylics. These components are being restricted or banned by recent governmental, environmental and clean air regulations in the United States and many foreign countries. Accordingly, water reduced or based latex, acrylic latex and vinyl latex coatings are now being used as substitutes. These coatings, however, provide little, if any, anti-soiling, anti-graffiti, anti-fungus and mildew stain resistance properties. Also, they do not provide the micro non-porosity necessary to allow repeated graffiti cleaning or to prevent water damage. In addition, most such coatings provide little protection against sun generated, ultra violet ("UV") chalking and pitting. Therefore, frequent re-painting is needed even though graffiti may not be a problem.

There is a second problem of anti-soiling (such as, hydro carbon exhausts, grease, oil, finger, scuff and scrape marks, spills and the like). With all public sector budgets under enormous pressure to cut costs and the real estate industry in an economic recession, the need exists to find more cost effective methods for general maintenance of both public and private buildings, such as office buildings, schools, residential buildings and the like, that require continual maintenance, cleaning and frequent repainting.

With the increasing restrictions on solvent based coatings and their unwanted VOC and concerns over environmental contamination and worker safety hazards of solvent based coatings, and since most water based coatings cannot provide the micro non-porosity and penetration resistance needed to withstand the repeated cleaning, neither coating resolves anti-soiling problems. The present invention, however, offers a viable, practical, efficient and cost effective film protective coating that can be repeatedly cleaned of such soiling using standard non-caustic, non-abrasive household cleaners.

There is a third problem with lead paint encapsulation. The public in general, government departments and the residential real estate industry have become increasingly concerned due to the hazardous health threat posed in all types of housing from previously applied lead paint and, especially, from lead paint dust that emanates from old, dried, cracking, peeling (lead) paint and from the removal of lead paint itself. This problem has become acute for families with young children under age ten.

The problem confronting all property owners faced with the need for a lead abatement program on their facilities is the matter of cost and lack of availability of financial resources to handle a lead paint removal program. Thus, encapsulation is being advanced as the only practical solution for many facilities. But even the concept of encapsulation often has serious problems in both its impracticality in many circumstances, and a higher cost than most lead abatement solutions.

Thus, a need for a lead paint encapsulation coating is critical if real progress in reducing the exposure and health hazards posed by existing lead paint is to be effectively addressed.

The present system is particularly adapted for use on surfaces having lead paint since it has all the properties needed for lead paint encapsulation coating, i.e. micro non-porosity, waterproof and high hydrostatic water resistance, elastomeric flexibility, very high adhesion and abrasion factors, high impact resistance and non-toxicity of the coating if ingested. These properties are reinforced by the other attributes of the coating, namely non-flammibility, non-hazardous, negligible VOC's, no fumes, water clean-up, high graffiti and soiling resistance, ability to withstand repetitive graffiti and regular soiling cleaning without damage to the coating.

The present system and the resultant film coat deals with a fourth problem, namely protection against corrosion, acid rain and chemical contaminant that occur daily on surfaces. In particular, acid rain is becoming an increasingly critical factor in the deterioration of stone and especially, limestone structures since the acid eats away at the stone. Likewise, chemical contaminants in the atmosphere from industrial pollution and in areas adjacent to salt water, salt air, salt mist and spray attack, exert corrosive stress on metal, especially iron, steel and aluminum.

Heretofore, a wide variety of industrial protective coatings, almost all of which have been solvent based or hazardous chemically based, are available to solve this problem. However, the increasing concern by government agencies, such as EPA and OSHA, and the private sector, and the various regulations and the practices of many government agencies are all but making the use of these types of coatings either illegal or cost prohibitive, and cumbersome from the standpoint of environmental and worker safeguard requirements.

The present system provides an environmental and worker safe, economically feasible and practical alternative to providing protection since it is not as expensive and prevents the often crippling results of corrosion, acid rain and chemical contaminant degradation. While the present system is not as durable in all respects as some of the older, flammable, highly toxic, high VOC industrial coatings, it will, because of its properties, especially its micro non-porosity and resistance to moisture, outperform practically all of the more recent environmentally compliant water based coatings currently on the market.

There is a fifth problem, namely the need for a coating that provides high dielectric resistance to the surface of metal fixtures, machinery, transmission facilities and equipment. Also, the coating needs to be non-flammable, micro non-porous, waterproof and have the elastomeric qualities necessary to handle expansion and contraction of the underlying metal. The increasing need to have a coating that contains all these properties, while simultaneously being fire retardant, environmentally and worker safe, is underscored as air, water and land pollution continue to effect adversely the quality of life. The present film coat has been found to have the enhanced dielectric resistance properties, especially on a steel structure, as well as all of the above properties.

There is a sixth problem, namely prevention of lead paint salt leaching, encapsulation of "blush rust" and existing graffiti. The pigmented version of the present system will cover and prevent leaching of lead salts, "blush rust" on metal, and existing graffiti, thereby preventing bleed-thru of the coating and spreading of rust on the surface under the subject protective coating.

There is a seventh problem and an eight problem, namely a need for an ingestion proof protective coating for lead paint encapsulation, and a protective coat that is effective for land and marine equipment and facilities.

The micro non-porosity, non-leaching and waterproofing characteristics of the present system and its film coat, coupled with the incorporation of the non-water soluble bittering/adversive agents provide protection against: (1) ingestion by children of any encapsulated old lead painting chips or peelings of such paint that is "over coated"(encapsulated) with the present film coat, and (2) the collection-attachment of certain marine life to marine surfaces coated with the present system incorporating such bittering/adversive agents.

There is a ninth problem, namely the encapsulation of asbestos. While not completely tested, it is believed that the film coat of the present system can, as it does with graffiti and lead paint, encapsulate and thereby contain asbestos that already exists of the surface.

Description of the Prior Art

U.S. Pat. No. 4,716,056 is directed to a SYSTEM FOR TREATING A SURFACE in which the system's composition rendered a treated surface substantially resistant to subsequent markings of graffiti and other defacements, and permits the coating to be readily, inexpensively and repeatedly cleaned using a particular cleaning composition without altering the surface or causing damage to any area in close proximity thereto. This system is a two coat system involving the use of two, separately applied coatings that, when applied one over the other, created a protective coating with extraordinary anti-graffiti performance. However, the polyurethane top coat of this two coat system has a high VOC content, and now undesired chemical components. The use of this top coat and, hence, the two coat system are now restricted in use in the United States and many other countries.

U.S. patent application Ser. No. 07/423,809 to Cassius Leys, the inventor of the present system, which was filed on Oct. 18, 1989, for A SYSTEM FOR TREATING A SURFACE is an improvement over U.S. Pat. No. 4,716,056. However, this patent application also involves chemicals that are to be subject to U.S. government, environmental and health restrictions.

The present system is a significant improvement over both of the above systems because the present system is a one coat system and not a two separate coat system, is non-flammable whereas the top coat of the two coat system is a highly flammable, has negligible VOC's and fumes whereas the top coat of the two coat system contains isocyanates and a VOC level of 4.2 lbs/gallon, and contains negligble hazardous or highly toxic chemicals thereby making the present system environmentally compliant and worker/end user safe as opposed to the two coat systems which contains undesirable and toxic components in its top coat.

SUMMARY OF THE INVENTION

Against the foregoing background, it is a primary object of the present invention to provide a non-leaching, one coat protective and encapsulating film coating system that provides a film coat which encapsulates previously applied lead paint and its resultant toxic lead salts and graffiti on certain surfaces, such as masonry, plaster, plaster board and other wall covering compositions, wood and metal.

It is another object of the present invention to provide such a system and film coat for treating a surface with previously applied graffiti to mask and totally hide existing graffiti and render the surface substantially resistant to penetration, permanent staining or adherence by subsequent applications of graffiti.

It is a further object of the present invention to provide such a system and film coat that can be easily, readily, inexpensively and repeatedly cleaned of graffiti subsequently applied to the protective coating by using a particular cleaning composition, without altering the surface or causing damage to any area in close proximity thereto.

It is still another object of the present invention to provide such a system and film coat that can be easily, readily and repeatedly cleaned of normal hydro carbon exhausts, grease, oil, finger, scuff and scrape marks, spills, stains and like type soiling, without discoloration or degradation of the coating or surface by using standard, non-abrasive, non-caustic household cleaners.

It is still a further object of the present invention to provide such a system and film coat that will protect the surface from corrosion, acid rain attacks, chemical substances and contaminants and degradation from the elements.

It is yet another object of the present invention to provide such a system and film coat that is virtually micro non-porous and thereby waterproof, and contains highly inhibiting hydrostatic water barrier properties.

It is yet still another object of the present invention to provide such a protective film coat that provides a high degree of dielectric resistance properties to treated metallic surfaces.

It is still yet another object of the present invention to provide such a film coat that, by the addition of certain bittering/adversive agents, is non-toxic, non-carcinogenic, non-biolidal, non-mutagenic and makes the film coat, and therefore the surface, virtually ingestion proof by humans, animals and most marine life.

It is still yet a further object of the present invention to provide such a film coat that will not burn, is non-flammable in both pre-application and post-application (cured) stages, and from which when subjected to intense fire heat, the resultant gases from thermal decompositions are virtually non-toxic.

It is yet still a further object of the present invention to provide such a film coat that consists of non-hazardous components, and is environmentally and worker safe thereby requiring nominal protective clothing and respiratory equipment.

It is still yet another object of the present invention to provide such a film coat that has negligible VOC's.

It is yet still another object of the present invention to provide such a film coat that has unique elastomeric, impact and abrasion resistance properties.

It is yet still another object of the present invention to provide such a film coat that has extraordinarily high adhesion properties including pull off, cross hatch and scrape adhesion.

To the accomplishments of the foregoing objects and advantages, the present system, in brief summary, includes a combination of a water based epoxy components , a water based polyurethane solution, a solvent based polyurethane group and oil based additives. More particularly, the present system is a one coat protective film coating system that includes: a film forming mixture having a first group of water based epoxy components, a water based polyurethane solution, a solvent based polyurethane group of components, and an oil based additive; and a curing and activating mixture having a second group of water based epoxy components and oil ester based catalysts-curing agents. The film forming mixture is between about 93 and about 105 parts by volume, and the curing and activating mixture is between about 76 and about 83 parts by volume of the system so that the entire system is between about 169 and about 188 parts by volume.

DESCRIPTION OF THE PREFERRED EMBODIMENTS

The present system comprises a multiple component, resin and film forming mixture ("Part A") and a multiple component, curing and activating mixture ("Part B"). The film forming Part A mixture has a water based epoxy group of components, a water based polyurethane solution, a solvent based polyurethane group of components, and an oil based additive. The curing and activator mixture has a water based epoxy group of components and oil ester based catalysts-curing agents for the curing of the polyurethane.

Referring to the film forming Part A mixture, the epoxy group includes: (1) a specially formulated water based epoxy resin system, (2) a water miscible dispersing agent, (3) a water miscible epoxy hardener-accelerator, (4) a water based polyurethane solution and (5) a flow enhancing additive. The epoxy group may also include a bittering agent or a combination of two or more bittering/adversive agents as anti-ingestion components.

The polyurethane group of the film forming Part A mixture includes: (1) a solvent based polyurethane resin system, (2) a solvent based hardener-accelerator, (3) a cross-linking, oil based bonding additive, and (4) one or more stabilizers. The polyurethane group may also include a bittering agent or combination of two or more bittering/adversive agents.

Referring to the curing and activating, Part B mixture of the present system, the water based epoxy components include (1) an epoxy resin base, (2) a filler, (3) a carrier-dispersing agent and (4) a carrying agent. The water based epoxy components may also include ethoxylated castor oil. The catalysts-curing agents includes two separate, oil ester based catalysts that interreact with each other to cure the polyurethane of the film forming group.

The film forming Part A mixture has an overall parts range (hereinafter referred to as "range") between about 93 parts and about 105 parts by volume. The curing and activating Part B mixture has a range between about 76 parts and about 83 parts by volume so that the entire system is between about 169 and about 188 parts by volume. In the preferred embodiment, the film forming mixture is about 100 parts and the curing and activating mixture is about 79.3 parts so that the preferred system has 179.3 parts by volume. The ratios of film forming and curing mixtures and the procedure for incorporation of the components in each mixture are critically important in obtaining the superior results of the finished coat.

Before further discussion of the present system, it should be understood that the system can be used on all substantive substrates or surfaces. These surfaces include, for example, masonary, such as cement, cement blocks, concrete, aggregates, brick, mortar and the like, plaster, plaster board and other wall covering compositions, wood, metal and aluminum. These surfaces can be either painted or unpainted. In addition, the coating, because of its very high adhesion characteristics, can be repeatedly recoated subject only to appropriate cleaning of contaminants off of the last coat on the surface. No roughing of the existing coating is necessary.

Depending on the condition of the surface to be treated, scraping, light sanding, brushing, degreasing, washing and/or wipe down may be required to clean properly the surface in order to enhance the adhesion of the coating to the surface. In addition, if splinters, rust, scale, loose or peeling paint, or the like, are present on the surface, it is necessary to remove them prior to application of the coating system. Additionally, if the surface has previously been painted several times, it is preferable to make certain that the previous coating has firm adhesion, is free of all contaminants, such as chalking, efflorescent, hydro carbon deposits, grease, oil, dust, dirt and the like, so that the coating will adhere completely. The surface may be dry or damp before application of the coating, but not wet.

If the surface is exceptionally damp or subject to heavy hydro-static moisture bleed-thru, then a waterproofing hydro-static barrier should be initially applied. Such a barrier is available as the first or primer coat of the system that is the subject of U.S. Pat. No. 4,716,056, which issued on Dec. 29, 1987 to Frank Fox and Cassius Leys, and U.S. patent application Ser. No. 07/423,809, which was filed on Oct. 10, 1989 by Cassius Leys, both of which are mentioned above and are incorporated by reference. The film forming Part A mixture of the present system includes two groups of components. The aqueous or water based first group of components is provided in a range between about 88 parts and 94 parts by volume, but preferably about 92.4 parts by volume of the film forming mixture. They include in the order of incorporation into the film forming mixture:

1. A water based epoxy resin system having a range between about 67 and about 83 parts, but preferably about 73.2 parts;
2. A water soluble dispersing agent having a range between about 1.5 parts and about 4.0 parts, but preferably about 3.0 parts;
3. A water miscible epoxy hardener having a range between 0.6 parts and about 1.5 parts, but preferably about 1.2 parts;
4. An aqueous self cross-linking, iso-cyanate free, polyurethane solution that acts to bond, i.e. as an enabling film forming agent, having a range between about 8.0 parts and about 20 parts, but preferably about 13.3 parts; and
5. A thinning, flow-enhancing additive having a range between about 1.5 parts and about 4.0 parts, but preferably about 1.9 parts.

The solvent based, polyurethane group of components have a range between about 5 parts and about 12 parts, but preferably between about 7.5 and about 7.7 parts of the film forming mixture. They include in the order of incorporation into the mixture:

1. A polyurethane resin system having a range between about 4.0 parts and about 8.0 parts, preferably about 5.9 parts;

2. A hardener-accelerator film former for the polyurethane resin system having a range between about 0.4 parts to about 0.8 parts, but preferably about 0.6 parts;
   10 3. A bonding and cross-linking, oil based additive for the polyurethane resin system having a range between about 0.6 parts to about 1.5 parts, but preferably about 0.9 parts; and
4. One or more stabilizers mixed into the bonding additive having a range between about .035 parts and about 0.15 parts, but preferably about 0.105 parts.

The water based epoxy resin system of the film forming Part A mixture is a specially formulated resin system that includes a polyamide resin and water. The polyamide resin is a water based resin. The preferred epoxy when the coat is pigmented, i.e. other than clear, is a customized variation of the film forming components of Dur-A-Poxy 200, Part A. Dur-A-Poxy 200, Part A is an emulsified epoxy resin hardener that has 30 to 50 percent water, 15 to 35 percent polyamide resin, 5 to 30 percent rutile titanium dioxide, 4 to 30 percent inorganic iron oxides, and 4 to 30 percent chromium oxide (trivalent chromium). For a clear coat, the resin system is a customized variation of Dur-A-Poxy 245, Part A. Dur-A-Poxy 245, Part A is an emulsified epoxy resin hardener that has 30 to 48 percent water, 20 to 35 percent polyamide resin, and 20 to 35 percent rutile titanium dioxide. Both resin systems are manufactured by Dur-A-Flex, Inc.

The resin system is present in an amount between about 67 parts and about 83 parts by volume of the film forming Part A mixture. In the preferred embodiment, the resin system is about 73.2 parts by volume of the film forming Part A mixture.

The pigmented epoxy includes polyamide resin, water and pigments, namely rutile titanium dioxide, inorganic iron oxides and other pigments. The other pigments include lampblack or any other color desired by the user.

The range, between about 67 parts and about 83 parts by volume, of the pigmented epoxy is broken down as follows: a polyamide resin between about 11 parts and about 26 parts, rutile titanium dioxide between about 8 parts and about 20 parts, inorganic iron oxides between about 4 parts and about 20 parts, other pigments between about 3 parts and about 10 parts, and water between about 25 parts and about 35 parts.

The preferred range, which is about 73.2 parts by volume, of the resin system is broken down as follows: the polyamide resin between 16 parts and about 20 parts, the rutile titanium dioxide between about 15 parts and about 16 parts, the inorganic iron oxides between about 5 parts and about 10 parts, the other pigments between about 4 parts and about 6 parts, and the water between about 27 parts and 31 parts.

If the present one coat system requires the application of a clear coat, the epoxy would not include the pigments, namely the rutile titanium dioxide, the inorganic iron oxides and the other pigments.

The epoxy is a catalyzed, true epoxy that will not alter the surface to which it is applied but, rather, will seal the graffiti, lead and/or corrosion and, perhaps, asbestos, on the surface. It has been found that the use of a catalyzed epoxy provides a good coating with exceptionally strong adhesion properties. The properties of the water based epoxy employed should be such that the graffiti it covers will not "bleed thru" that is to say, the underlying graffiti will not react with, be lifted off by, or penetrate through the coat.

The second component of the epoxy group of the film forming mixture is a water soluble dispersing agent or solvent. It acts to break down the surface tension and disperse any agglomerates with the polyamide resin, pigments and water.

The preferred water soluble dispersing agent is a combination of methylpyrrolidone and dimethyl sulfoxide. The methylpyrrolidone alone can be used, however it does not provide the finish coat with the gloss provided by the combination.

The methylpyrrolidone is sold under the name N-Pyrrolidone or M-Pyrol by BASF Corporation and the GAF Corporation, respectively.

The dimethyl sulfoxide, also known as DMSO, methyl sulfoxide, provides a gloss to the finished coat. The preferred dimethyl sulfoxide is available from Gaylord Chemical Corporation.

Alternatively, n-Propoxypropanol or 2 propanol, 1-propoxy/propylene glycol, 2 propyl ether can be used. However, it is believed that this solvent or dispersing agent does not work as effectively as either of the above. The particular n-Propoxypropanol is sold under the name Propyl Propasol by Union Carbide Chemicals and Plastic Company, Inc.

The water soluble dispersing agent is present in the present one coat system in an amount between about 1.5 parts and about 4.0 parts by volume of the total parts of the film forming Part A mixture. In the preferred embodiment, which is the combination of both, the methylpyrrolidone is present in an amount about 2.4 parts and the dimethyl sulfoxide is present in an amount about 0.6 parts, so that the total of the dispersing agent is about 3.0 parts by volume of the total parts of the preferred film forming mixture.

The third component of the epoxy group of the film forming Part A mixture is a water miscible epoxy resin hardener that is used as an accelerator and curing agent. This hardener-accelerator is a tertiary amine that is diluted forty percent with distilled water. At present, the only tertiary amine that has been found to perform adequately in the present system is Ancamine K-54 distributed by the Pacific Anchor Chemical Corporation. It is a modified aliphatic polyamine that has low viscosity, light amber liquid having a specific gravity of 0.97 and a density of 8.1 lbs/gallon at 77 degrees Fahrenheit.

This hardener-accelerator is present in an amount between about 0.6 parts and about 1.5 parts by volume of the total parts of the film forming Part A mixture. In the preferred embodiment, the hardener-accelerator is present in an amount about 1.2 parts by volume of the preferred film forming mixture.

The fourth component is an aqueous, self cross-linking polyurethane solution that acts to enable or bond the ingredients. This bonding agent is free of iso-cyanates. It acts to enable the water based resin system and to mix with the other components in the overall system.

The preferred bonding agent is Witcobond W-240 which is commercially available from the Witco Chemical Corp. The material safety data sheet for Witcobond W-240 states that it is an aqueous polyurethane dispersion that has a specific gravity of 1.05, a vapor pressure of less than 1 mm Hg. at 20×C and a pH from 7 to 9. It is present in an amount between about 8.0 parts and about 20 parts by volume of the total parts of the film forming Part A mixture. In the preferred embodiment, it is about 13.3 parts by volume of the total parts of the preferred film forming mixture.

A solvent is added a second time as a thinning, flow enhancing additive to the film forming Part A mixture. Its purpose is to thin out the heavy viscous mixture of the previously mixed specially formulated resin system, the dispersing agent, the epoxy resin hardener and the bonding agent. The preferred flow enhancing additive is methylpyrrolidone. Propyl propasol can, however, be used. Also, dimethyl sulfoxide can be used in conjunction with and as a partial substitute for methylpyrrolidone as this second solvent. Due to the fact that dimethyl sulfoxide is a very strong solvent, it is not preferred as a thinner at this step of formulation.

The flow enhancing additive is present in an amount between about 1.5 parts and about 4 parts by volume of the total parts of the film forming Part A mixture. In the preferred embodiment, the solvent is present in an amount about 1.9 parts by volume of the preferred film forming mixture.

The present system may also include a bittering/adversive agent. The purpose of the bittering agent is to make certain that the coating of the system is not ingested by a child or animal. The preferred bittering agents that have been found to prevent ingestion are denatonium saccharide and synthetic capsaicin (non-water soluble). Both denatonium saccharide and synthetic capsaicin are manufactured and patented by Atomergic Chemical Corporation. At present, the most preferred bittering agent is a combination of both.

The bittering/adversive agent is added to the dispersing agent of the epoxy group in an amount between about 1,000 to about 2,000 parts per million (ppm) of one part by volume of the total parts of the film forming Part A mixture. In the preferred embodiment, it is present in about 1,500 parts per million (ppm) of one part by volume of the total parts of the preferred film forming mixture.

Concerning the solvent based, polyurethane group of the film forming Part A mixture, the first component is the polyurethane resin system. The polyurethane resin systems that are known to work in the present formulation are resin systems 24-F2-1 ("F2") and 24-F3-1 ("F3") which are commercially available from Crown Metro Aerospace Coatings, Inc., and DU1000 which is commercially available from PPG Industries, Inc.

The F3 resin system is the most preferred. It can be used on all of the surfaces applicable to the present system. The DU1000 resin system does provide the same favorable results as the F3 resin system, and also can be used on all surfaces. The F2 resin system has been found to work well only on electrostatic surfaces. In addition, it includes cyclohexanone which, according to some U.S. regulatory standards, is a hazardous ingredient. Accordingly, the F2 resin system is the least desired of the three resin systems in the present formulation.

The F3 resin system comprises, in percentage by volume, less than 33.33 percent of a polyester resin, less than 16.67 percent of toulene, less than 8.33 percent of xylene, less than 16.67 percent of n-butyl acetate and less than 25 percent of 2 ethoxyethylacetate.

The F2 resin system comprises, in percentages by volume, 44.45 percent of a polyester resin, 11.11 percent of n-butyl acetate, 22.22 percent of 2 ethoxyethylacetate, 11.11 percent of cyclohexanone and 11.11 percent of propylene glycol monomethyl either acetate.

DU1000, like F2 and F3, is a polyurethane resin system. The material safety data sheet for this material states that it comprises, in percentage by weight, from 45 to 50 percent of n-butyl acetate, from 2 to 5 percent of toulene, from 1 to 2 percent of benzotriazole UV absorber and from 40 to 45 percent of film formers, resins and additives.

The polyurethane resin system is present in an amount between about 4.0 parts and about 8.0 parts by volume of the film forming Part A mixture. In the preferred embodiment, the polyurethane resin is present in an amount between about 5.9 parts by volume of the preferred film forming mixture.

The second component of the polyurethane group of the film forming Part A mixture is a hardener-accelerator film former. The hardener-accelerator is DXU-789 manufactured by PPG Industries, Inc. DUX-789, as set forth in the material safety data sheet of PPG Industries, Inc., is from the alkyd chemical family and is a polyurethane activator. It is comprised, in percentage by weight, from 25 to 30 percent N-butyl acetate, from 20 to 25 percent toulene, from 2 to 5 percent isopropyl alcohol (anhydrous), from 15 to 20 percent tertiary amine, and from 30 to 35 percent film formers, resins and additives.

The modification of the polyurethane resin system, especially by the addition of the DXU-789, increases the hardness of the film coat and makes the coat non-microporous. The film coat provides a relatively hard, but flexible, impervious surface that may be readily cleaned and prevents penetration of solvents and free radical ions therein.

DUX-789 is present in an amount between about 0.4 parts and about 0.8 parts by volume of the total parts of the film forming Part A mixture. In the preferred embodiment, DXU-789 is present in an amount about 0.6 parts by volume of the preferred film forming mixture.

The third component in the polyurethane group of the film forming Part A mixture is a bonding additive. The bonding additive is a non-toxic, oil based polyol that is used instead of a solvent to provide cross-link bonding. The particular polyols that have been used are Caspol 1962, Caspol 5004 and Caspol 5005 all in castor oil. All three Caspols are commercially available from CasChem Inc. The most preferred polyol is Caspol 1962 which has non-volatile percent of 100 a viscosity of 1550 cps at 25 degrees centigrade, an acid value of 1.5, an OH value of 390, an OH equivalent weight of 390 a specific gravity of 0,996 and a weight per gallon of 8.30 lbs. Caspol 5004 has a viscosity of 3200 cps at 25 degrees centigrade, an acid value of 3.0, an OH value of 325, an OH equivalent weight of 173, a specific gravity of 0.999, a weight per gallon of 8.3 lbs., an iodine value of 74 and a saponification value of 158. Caspol 5005 has a viscosity of 1400 cps at 25 degrees centigrade, an acid value of 0.5, an OH value of 288, an OH equivalent weight of 195, a specific gravity of 1.020, a weight per gallon of 8.5 lbs., an iodine value of 36 and a saponification value of 87.

The oil based polyol is present in an amount between about 0.60 parts and about 1.50 parts by volume of the total parts of the film forming Part A mixture. In the preferred embodiment, the polyol is present in an amount about 0.9 parts by volume of the preferred film forming mixture.

The fourth component of the polyurethane group of the film forming Part A mixture is a stabilizer. The preferred stabilizer is a combination of a hindered amine light stabilizer and a UV absorber. It is possible to practice the invention with either the hindered amine light stabilizer or the UV absorber (stabilizer) alone.

The hindered amine light stabilizer provides significant levels of stabilization, extended life and durability to the film coat by inhibiting the degradation of the molecular bond amongst the system's components. This absorber stabilizes without absorbing ultraviolet radiation. Accordingly, it is uniquely suited for stabilizing ultraviolet cured coatings. The UV absorber is included to absorb UV.

The preferred hindered amine light stabilizer is bis (1,2,2,6,6-pentamethyl-4-piperirdinyl) sebacate mixture. It is commercially known as Tinuvin 292 and is available from Ciba-Geigy Corporation. Tinuvin 292 is present in a range between 0.005 parts and 0.06 parts by volume of the film forming Part A mixture, and preferably 0.03 parts.

The UV stabilizer is a reaction product of beta-(3-(2H-benzotriazol-2-YL)-4-hydroxy-5-tert-butylphenyl)-propionic acid, methyl ester and polyethylene glycol 300. The preferred UV absorber or stabilizer is sold under the name Tinuvin 1130 and is also available from Ciba-Geigy Corporation. It is especially applicable when the present system is used on surfaces that directly receive UV rays. The UV absorber is present in a range between 0.03 and 0.09 parts, and preferably 0.075 parts.

Therefore, the stabilizer, preferably the combination of both the hindered amine light and the UV, should be present in a range between about 0.035 parts and about 0.150 part, but preferably about 0.105 parts.

In the most preferred embodiment of the present system, both the epoxy and the polyurethane groups of the film forming mixture include a non-water soluble bittering/adversive agent. The most preferred bittering agent, which acts as an anti-ingestion agent, is, as with the epoxy group, denatonium saccharide in .combination with synthetic capsaicin. However, as with the epoxy group, the bittering agent can be either denatonium saccharide or synthetic capsaicin alone.

The bittering/adversive agent is present in trace amounts in the polyurethane group of the film forming Part A mixture. In particular, it is present in an amount between about 300 and 700 parts per million by volume of one part of the total parts of the film forming mixture. While in the preferred embodiment, it is present in an amount about 500 parts per million by volume of one part of the preferred film forming mixture.

The second mixture or Part B mixture of the present system is the curing and activating mixture. The Part B curing mixture includes a portion of the water based epoxy system and a system of non-water soluble, oil ester based, catalysts-curing agents.

As stated above, the overall one coat system includes the Part B curing and activating mixture in an amount between about 76 and about 83 parts by volume, while the Part A film forming mixture is in an amount between about 93 and about 105 parts by volume. The preferred one coat system includes the curing and activating mixture in an amount about 79.3 parts by volume, while the film forming mixture is in an amount about 100 parts by volume.

The range of the curing and activating mixture is broken down into the water based epoxy portion between about 71 to about 76 parts by volume and the catalysts-curing agents between about 5 and about 7 parts by volume. The preferred curing and activating mixture, which is 79.3 parts, of which the preferred water based epoxy portion is 73.2 parts by volume, and the preferred catalysts-curing agents being 6.1 parts by volume.

The water based epoxy portion of the curing and activating mixture is a preferred modified epoxy resin system. The preferred epoxy resin system is commercially available under the name Dur-A-Poxy 200, Part B, from Dur-A-Flex, Inc. This epoxy resin system includes between 25 percent and 45 percent diglycidyl ether bisphenol A epoxy resin, between 20 and 35 percent calcium carbonate, between 2 percent and 4 percent propylene glycol and between 20 percent and 40 percent water. This resin system may also have up to and including 1 percent of ethoxylated castor oil.

Stated another way, this resin system in parts of the curing and activating Part B mixture includes between about 15 and about 29 parts of diglycidyl ether bisphenol A epoxy resin, between about 15 parts and about 26 parts of calcium carbonate, between about 1.5 parts and about 3.0 parts of propylene glycol and between about 15 parts and about 30 parts of water. The resin system can include up to and including about 1.0 part of ethoxylated castor oil.

In the preferred curing and activating mixture, the resin comprises between about 20 parts and about 25 parts of diglycidyl ether bisphenol A epoxy resin, between about 20 parts and about 24 parts of calcium carbonate, between about 2.0 parts and about 2.5 parts of propylene glycol and between about 23 parts and about 27 parts of water. The resin system can include between about 0.6 parts and about 0.8 parts of ethoxylated castor oil.

The calcium carbonate is a base filler. The propylene glycol is a combined carrying and dispersing agent that disperses the diglycidyl ether and the calcium carbonate. The water is the main carrying agent. The ethoxylated castor oil is not needed in the present system, however it has been found that when it is added it enhances the surface finish of the coat applied to the surface.

The curing and activating Part B mixture has a first and a second catalyst that act as curing agents for the polyurethane. These catalysts are non-water soluble, oil ester based, iso-cyanate free, components in the present system.

The first catalyst is from the organotin compound chemical family. It is an alkyltin carboxylate. The preferred first catalyst is sold under the name Cotin 222 by CasChem, Inc.

The first catalyst is present in the curing and activating Part B mixture in an amount between about 2 parts and about 3 parts by volume. In the preferred curing and activating mixture, the first catalyst is present in an amount about 2.44 parts by volume.

The second catalyst includes tin, but has no odor problems or corrosiveness problems normally associated with organotin acetates. The catalyst also comes from the organotin compound family. It is, however, a dimethyltin dimeodecanoate. The preferred catalyst is sold under the name Cotin 280. It is also commercially available from CasChem, Inc.

Alternatively, the second catalyst that can be substituted comes from the bismuth carboxylate chemical family. It is a bismuth neodecanoate. The preferred alternative second catalyst is sold under the name Coscat 83 by Cosan Chemical Corporation.

The second catalyst is present in the curing and activating Part B mixture in an amount between about 3 parts and about 4.5 parts by volume. In the preferred curing and activating mixture, it is present in an amount about 3.66 parts by volume.

It has been found that the present system must be formulated in a certain sequence that cannot be deviated from or else the individual mixtures and the overall coating system will not stay as a homogenous mixture, i.e. it will curdle and/or separate out into separate (stratified) layers.

The formation of the film forming Part A mixture of the system is as follows: about 73.2 parts of the customized Dur-A-Poxy 200, Part A, resin is set aside and mixed thoroughly for a minimum of ten minutes until the resultant mixture is viscous and gooey. It is understood that for each step, the new ingredient is added directly to the existing mixture and is mixed thoroughly. About 2.4 parts of methylpyrrolidone and about 0.6 parts of the dimethyl sulfoxide are blended together and then added to the resin, and mixed for about 5 minutes until the resultant mixture is smooth and creamy. The methylpyrrolidone and dimethyl sulfoxide acts to reduce surface tension and eliminate any agglomerates and the otherwise gooey constituency of the mixture.

For the third step, about 1.2 parts of the Ancamine K-54 diluted by forty percent distilled water is added and the resulting mixture is mixed for about five minutes until the Anacamine K-54 is thoroughly dispersed in the resultant mixture and the resultant mixture is smooth and creamy. Then, about 13.3 parts of Witcobond W-240 is slowly blended into the existing mixture for about ten to about fifteen minutes. The resultant mixture will, at first, become very thick and grainy. However, once the Witcobond W-240 is completely incorporated therein, the resultant mixture will again be smooth and creamy but thicker than before. The fifth step consists of adding about 1.9 parts of methylpyrrolidone and mixing for about five minutes until the resulting mixture again becomes a thinner, creamy mixture. The methylpyrrolidone in this step serves to dilute and disperse the other ingredients in the mixture. About 5.9 parts of the polyurethane resin system, 0.6 parts of the hardener-accelerator, 1.22 parts of the Caspol 1962 in castor oil, 0.03 parts of the Tinuvin 292 and 0.075 parts of the Tinuvin 1130 are mixed for about two minutes. Once mixed, they are added to the mixture in a sixth step, and mixed for about five minutes until the mixture is homogenous and very smooth.

When a bittering agent is included in the system, the denatonium saccharide and synthetic capsaicin are dissolved in the methylpyrrolidone and the dimethyl sulfoxide in step two and dissolved in the methylpyrrolidone in step five above and dissolved in the polyurethane resin system and the hardener-accelerator in step six before the addition of the Caspol 1962 in castor oil, the Tinuvin 292 and the Tinuvin 1130.

The mixing of the film forming Part A mixture will take approximately forty-five minutes to obtain the desired blend. The mixing itself should be accomplished with a slow moving bread doughhook in planetary mixer.

The curing and activating Part B mixture is formed as follows. First, start with about 73.2 parts of Dur-A-Poxy 200-B (the catalyst for the epoxy components in Part A mixture) and mix it for about ten minutes with the polyurethane catalyst-curing agents, which are composed of a blend of about 3.66 parts of the Cotin 280 catalyst-curing agents and about 2.44 parts of the Cotin 222 catalyst-curing agents to form a mixture. (The Cotin 280 and the Cotin 222 should be mixed together for about five minutes to insure proper homogenization of the two polyurethane catalyst-curing agents.)

The formation of the curing and activating mixture should take approximately ten minutes. The mixing of these components, unlike the film forming mixture components, should be accomplished with a low speed mixer to prevent the formation of foam.

Lastly, the film forming Part A mixture and the curing and activating Part B mixture are mixed together just prior to being applied to a substrate or surface by mixing the film forming Part A mixture with the curing and activating Part B mixture for approximately from three to five minutes so that the subject one coat system is formed.

It is believed that the present system produces three separate reactions once applied to a surface. In the first reaction, the solvent based, polyurethane components separate out from the water based epoxy components and the water based polyurethane solution. A layer of water based components (both epoxy and polyurethane) is formed on the substrate or surface being coated and a layer of the solvent based, polyurethane solution is formed on the surface of the water based layer. The second reaction is that the water based layer cures to form a film base on the surface coated. The third reaction is that the solvent based, polyurethane layer forms a cured top coat on the water based layer and, thus, on the surface, in a fused, non-delaminable manner.

The present system, primarily because of its viscosity and glue like tendency, should be applied to that damp or dry surface in a cross hatch pattern by conventional method of application, i.e. by the use of a special roller or squeegee brush or airless spray. In cases where the use of a brush or roller/squeegee is used, care must be taken to apply the coating in one (same) way strokes so as to prevent the "pull" effect that "back and forth" application strokes will exert on the coating. A particularly preferred application that will guard against this effect is by the use of an airless or air assisted airless sprayer, but not an air system. The former two permit a faster and more even application.

The coating is applied at about 2 to 4 mil wet film thickness per coat. The time for the coat to dry on the surface is from four to eight hours depending on ambient temperature and humidity.

The present system is a combination of, heretofore, incompatible components. It is a blend of water based epoxy, water based polyurethane, solvent based polyurethane and oil based additives. In addition, various pigments, resins, solvents, hardeners-accelerators, dispersing and curing agents are included.

The present system and film coat provides an unusual and unique array of characteristic and properties not generally available in present solvent base or water base coatings. The present invention incorporates the best and most desirable characteristics of both types of coatings.

The particular combination of the components of the present system provides an anti-graffiti, anti-soiling, anti-corrosion and lead paint/dust encapsulation protective coat that is free of the general toxicity and hazardous risks associated with most solvent-polyurethane protective coatings. In addition, the coat is non-flammable, will not burn or discharge toxic amounts of thermal decomposition gases and has elastomeric properties similar to that of a flexible rubber based paint. Also, it is micro non-porous and provides the impervious "shell-like" surface associated with polyurethane coatings.

Certain tests have been performed on the present system. The type of test and results of the test are set forth below. All of the tests were performed by United States Testing Company, Inc. unless indicated otherwise.

ASTM E-84-09a test method for surface burning characteristics of building materials, performed on August 6, 1991, has shown that the coating, both in its liquid and cured state, is non-flammable, will not burn, is self extinguishing and will not support flame creep (spread) or extensive smoke development.

The coating, when subjected to fire in accordance with U.S. Testing Co.'s U.S. Navy #MIL M-14G Burn Test for Toxicity performed in Aug., 1991, has been found not to give off any toxic gases, such as cyanide and ammonia, and less than 1 part per million, if any, of hydrogen chloride. Also, it emits negligible amounts of aldehydes, i.e. 4 parts per million, carbon monoxide, i.e. 8 parts per million, oxides of nitrogen as NO2, i.e. 50 parts per million, and carbon dioxide, i.e. 500 parts per million.

The coating is environmentally and worker safe and non-toxic in its cured form because it contains no currently known carcinogenic or mutagenic chemicals or components as defined by EPA, USHA, California and New Jersey Departments of Health standards. The coating has been found to contain virtually no hazardous amounts of toxic or hazardous chemicals as shown in the Acute Oral Toxicity Limit test performed in Aug. of 1991.

The coating is fumeless, and has been found, in accordance with ASTM D3960 test method for determining VOC levels of paints and related coatings, performed in August of 1991, to have a VOC rating of 0.04 lbs/gallon-5 grams/liter. This is well below the U.S. EPA Clean Air legislative targets of 2.2 lbs/gallon—260 grams/liter.

The coating is believed to be micro non-porous, waterproof and to provide a very high resistance to hydrostatic water pressure. This belief is predicated on a six month submerged coating brick test performed by the assignee of the present application.

ASTM D1308 test method for the effect of household cleaners and industrial chemicals on clear and pigmented finishes, performed in August, 1991, revealed that the coating has been found by to be stain and spot chemical reaction resistant to a broad spectrum of 22 common household cleaning and industrial chemicals.

The coating will withstand repeated washing of soiling, oil, grease and other hydro carbon contamination with standard, non-abrasive, non-caustic household cleaners. Also, the application operations, spills and equipment clean up is done easily with water.

The coating can be repeatedly cleaned of graffiti with non-abrasive, non-caustic, non-acidic compatible graffiti cleaners.

The coating has very high surface adhesion. In particular, ASTM D3359 test method for measuring adhesion performed in August, 1991, resulted in a general cross hatch adhesion rating of 5B (Best), ASTM D4541 test method for determining pull-off strength of coatings resulted in a pull-off adhesion rating of 180 lbs/square inch, and ASTM D2197 test method for adhesion of organic coatings by scrape adhesion resulted in a scrape adhesion rating surpassing 6 kilograms.

The coating has been found, pursuant to ASTM D2794 test method for resistance of organic coatings on the effects of rapid deformities (impact), performed in August, 1991, to have a very high impact resistance of 140 inch pounds (the highest impact).

The coating has been found, pursuant to ASTM D3363 test method for determining hardness, to have a hardness rating of 8H. This is an exceptionally high rating.

The coating has been found, pursuant to the falling sand abrasion resistance test ASTM D968, to have a high abrasion resistance of 150 liters of sand.

The coating has been found, pursuant to ASTM D1737 test method for elongation of attached organic coatings with cylindrical mandrel apparatus, performed in September, 1991, to have a high elastomeric-flexibility rating. The film passed a ⅛ inch cylindrical mandrel bend test.

The coating has been found, pursuant to ASTM G53 test, to have a high non-chalking, non-yellowing and UV resistance. This test is for operating light and exposure apparatus for exposure of nonmetallic materials.

The coating, once cured and properly cleaned of any contaminants, can be re-coated without the need for rough up or marring the original coating.

The coating has been found, pursuant to ASTM D149 test method for dielectric breakdown voltage strength of solid electrical insulating materials at commercial power frequencies, performed in September, 1991, to have a high dielectric resistance of 1052 kilovolts (Kv) per mil thickness.

Having thus described the invention with particular references to the preferred forms thereof, it will be obvious that various changes and modification may be made therein without departing from the spirit and scope of the invention as defined by the appended claims.

Wherefore, we claim:

1. A one coat system that produces a single film coat on the surface that has a negligible VOC rating, said system comprising:
   a film forming mixture having a first group of water epoxy components, a water based polyurethane solution, a solvent based polyester resin group and an oil based polyol, wherein the solvent based polyurethane group is iso-cyanate free; and
   a curing and activating mixture having a second group of water borne epoxy components and oil ester based agents,
   wherein the film forming mixture and the curing and activating mixture are mixed together prior to being applied to the surface.

2. A one coat system that produces a single film coat on the surface that has a negligible VOC rating, said system comprising:
   a film forming mixture having a first group of water epoxy components, a water based polyurethane solution, a solvent based polyester resin group and an oil based polyol, wherein the film forming mixture is between about 93 and about 105 parts by volume; and
   a curing and activating mixture having a second group of water borne epoxy components and oil ester based agents, and wherein the curing and activating mixture is between about 76 and about 83 parts of the system.

3. The system of claim 1, wherein the first water based epoxy group includes a first epoxy resin, a water miscible dispersing agent, a water miscible epoxy hardener-accelerator, the water based polyurethane solution and a flow enhancing additive.

4. The system of claim 3, wherein the first water based epoxy group also has a bittering/adversive agent.

5. The resin of claim 3, wherein the first epoxy resin includes a polyamide resin and water.

6. The system of claim 5, wherein the dispersing agent is a combination of methylpyrrolidone and dimethyl sulfoxide.

7. The system of claim 6, wherein the water miscible epoxy hardener-accelerator is a tertiary amine diluted forty percent by distilled water.

8. The system of claim 7, wherein the tertiary amine is a low viscosity, light amber liquid having a specific gravity of 0.97 and a density of 8.1 lbs./gallon at 77 degrees Fahrenheit.

9. The system of claim 8, wherein the water based polyurethane solution acts as an agent that enables the blending of all components of the system.

10. The system of claim 9, wherein the flow enhancing additive is methylpyrrolidone.

11. The system of claim 1, wherein the solvent based polyester resin group of components of the film forming mixture includes a bittering/adversive agent.

12. The system of claim 1, wherein the solvent based polyester resin group of components of the film forming mixture has a solvent based polyurethane resin system and a solvent based hardener-accelerator.

13. The system of claim 12, wherein the solvent based polyester resin group of components also has the oil based additive and a stabilizer.

14. The system of claim 13, wherein the stabilizer is a hindered amine light stabilizer and a UV absorber.

15. The system of claim 14, wherein the hindered amine light stabilizer is bis (1,2,2,6,6-pentamethyl-4-piperidinyl) sebacate.

16. The system of claim 14, wherein the UV absorber is a reaction product of beta-(3-(2H-benzotriazol-2-YL)-4-hydroxy-5-tert-butylphenyl)propionic acid, methyl ester and polyethylene glycol.

17. The system of claim 12, wherein the solvent based polyesters resin group of components of the film forming mixture includes a polyesters resin system that comprises, in percentage by volume, less than 33.33 percent of a polyester resin, less than 16.67 percent of toluene, less than 8.33 percent of xylene, less than 16.67 percent of N-butyl acetate and less than 25 percent of 2 ethoxyethylacetate.

18. The system of claim 12, wherein the solvent based hardener-accelerator of the film forming mixture is a polyurethane activator from the alkyd chemical family that comprises, in percentage by weight, 25 to 30 percent n-butyl acetate, 20 to 25 percent toluene, 2 to 5 percent isopropyl alcohol, 15 to 20 percent tertiary amine and 30 to 35 percent film formers, resins and additives.

19. The system of claim 1, wherein the second water based epoxy group of components of the curing and activating mixture has between 25 percent and 45 percent diglycidyl ether bisphenol A epoxy resin, between 20 and 35 percent calcium carbonate, between 2 and 4 percent propylene glycol and between 20 and 40 percent water.

20. The system of claim 19, wherein the second water epoxy group of components of the curing and activating mixture has up to 1 percent of ethoxylated castor oil.

21. The system of claim 1, wherein the oil ester based agents have two separate catalysts that act as curing agents.

22. The system of claim 19, wherein the two catalyst have an alkyltin carboxylate catalyst and a dimethyltin dimeodecanoate catalyst.

23. The system of claim 1, wherein the film coat encapsulates lead paint and existing graffiti on the surface and prevents the penetration into the surface of future graffiti and prevents the leaching out of harmful lead paint salts and graffiti from the encapsulated areas.

24. The system of claim 1, wherein the film coat has the negligible VOC rating of 0.04 lbs/gallon (5 grams/liter).

25. The system of claim 1, wherein the system produces a film coat on the surface that has an abrasion resistance of 150 liters of sand.

26. The system of claim 1, wherein the system produces a film coat on the surface that upon thermal decomposition emits negligible amounts of toxic materials, wherein the negligible amounts include: 0 parts per million of cyanide and ammonia, less than 1 part per million of hydrogen chloride, 4 parts per million of aldehydes, 8 parts per million of carbon monoxide, 50 parts per million of oxides of nitrogen, and 500 parts per million of carbon dioxide.

27. The system of claim 1, wherein the system produces a film coat on the surface that has a pull-off adhesion rating of 180 lbs/square inch.

* * * * *